Jan. 6, 1942.   R. W. CUMMINGS   2,268,856
METHOD OF AND APPARATUS FOR CUTTING BLANKS FROM SHEET MATERIAL
Filed Jan. 4, 1941
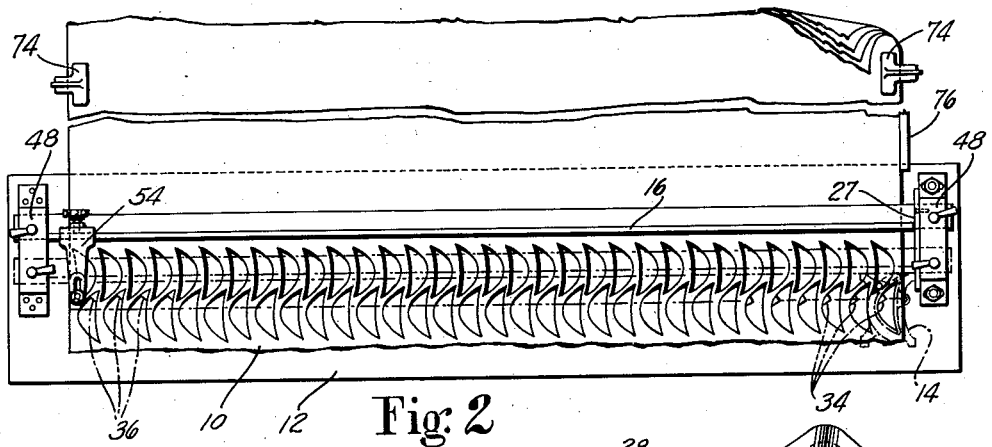
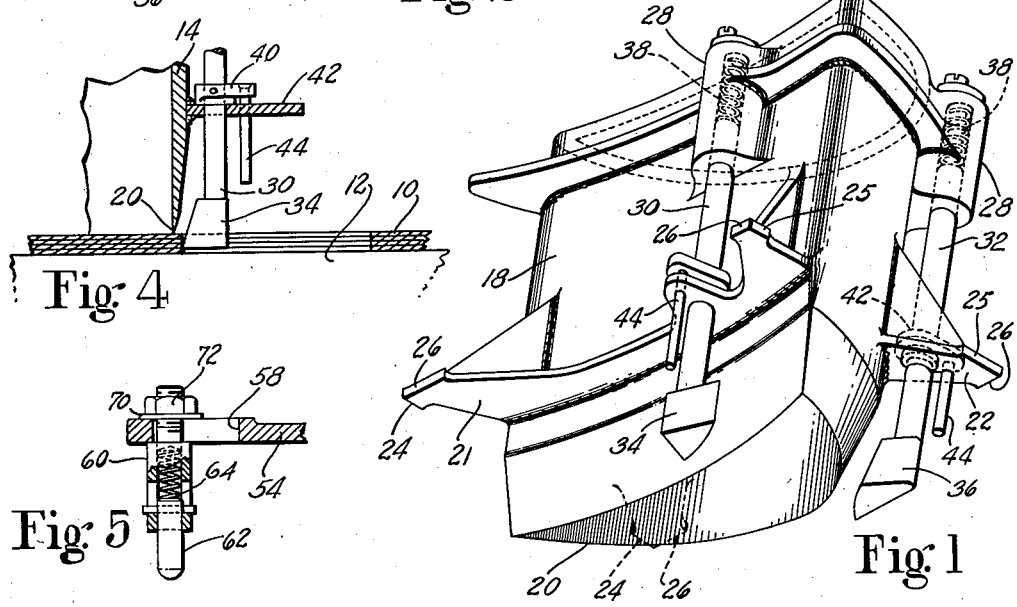
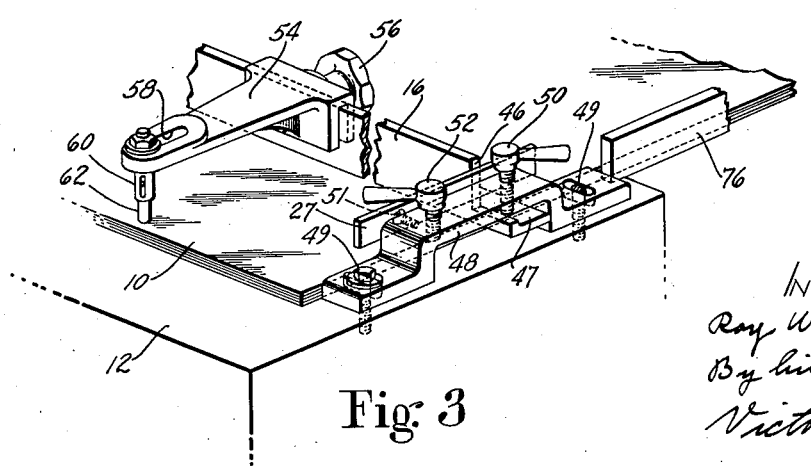

Patented Jan. 6, 1942

2,268,856

UNITED STATES PATENT OFFICE 2,268,856

METHOD OF AND APPARATUS FOR CUTTING BLANKS FROM SHEET MATERIAL

Roy W. Cummings, Beverly, Mass., assignor to United Shoe Machinery Corporation, Flemington, N. J., a corporation of New Jersey Application January 4, 1941, Serial No. 373,120

5 Claims. (Cl. 164—29)

This invention relates to the cutting of blanks from sheet material and is herein illustrated in relation to the cutting of shoe part blanks, such as box toes, from layers of fabric or other sheet material.

In producing shoe part blanks, such as box toes, counters and other parts which go into a shoe, use has been commonly made of a die which is forced through one or more layers of sheet material to form the blanks, it being customary to locate the die in successive dieing-out operations by hand in such a way that, during each operation, the die is positioned closely adjacent to a previous cut in order to utilize all the material possible to avoid waste. It is an object of the present invention to provide an improved method of cutting sheet material, in which the dies are so placed as to reduce the amount of waste of material to a minimum.

To this end and as illustrated, one feature of the invention comprises a method which consists in providing a die having a plurality of work-engaging members and a guide for locating the die widthwise of the material, successively locating the die along the guide widthwise of the material, utilizing one set of gage members, performing a series of cuts in a row widthwise of the material to produce blanks, shifting the material relatively to the guide, successively locating the die widthwise of the material along the guide with other of the gage members in engagement with the guide to locate the die successively in position close to the previous row of cuts made, and performing dieing-out operations to form a series of cuts widthwise of the material in producing a second row of blanks. This method is advantageous in that the die is quickly and accurately located in position for forming successive cuts in a row of cuts, as well as in performing successive rows of cuts such that the material is utilized to form blanks with only a small amount of waste between the cuts. At the same time, this method facilitates the handling of the material and the die during the dieing-out operations, enabling the operator, even though comparatively unskilled, accurately and rapidly to locate the die for each cut with a minimum of effort.

Another feature of the invention relates to a die, which, as herein illustrated, comprises a hollow cutting blade provided with gages for locating the die both widthwise and lengthwise of a sheet of material with the cutting edge located in any one of a plurality of predetermined positions, such that successive dieing-out operations will produce a plurality of closely nested cuts. Preferably, some of the gages are arranged to engage a portion of the material in a previously made cut for locating the die with its cutting edge close to the cut in such a way that there is little waste of material.

These and other features of the invention are disclosed in the following specification and in the accompanying drawing, and are pointed out in the claims.

In the drawing,

Fig. 1 is a perspective view of a die constructed in accordance with my invention;

Fig. 2 is a plan view illustrating mechanism for holding the work upon a support and for guiding the die across the work;

Fig. 3 is a perspective view of a portion of the mechanism shown in Fig. 2;

Fig. 4 is a side view, partly in section, showing one of the gages on the die in work-engaging position; and Fig. 5 is a side elevation, partly in section, of a work gage member.

As illustrated in Fig. 2, the invention contemplates the cutting of box toe blanks from a plurality of layers of sheet material 10, located upon a work support 12, successive rows of nested cuts being made in the material by means of a die 14, which can be driven through the material either by a hand mallet or a reciprocating presser member (not shown), the die being located in its successive positions lengthwise of the material by means of a guide member or straight edge 16.

The die 14 comprises a hollow base member 18 terminating in a cutting edge 20 corresponding in outline to that of a box toe blank, which it is desired to produce from the sheet material, commonly fabric impregnated with stiffening material. The die 14 is provided with laterally extending abutments or plates 21 and 22, having four corners, edge portions of which are machined to form gaging surfaces 24, 25 and 26. The surfaces 24 and 25 are arranged to engage the guide member 16 in locating the die lengthwise of the material for various positions of the die transversely of the material. When the surfaces 24 at the left-hand portion of the die (Fig. 1) are in engagement with the guide member, the convexly curved portion of the cutting edge 20 extends to the right. The reverse is true when the surfaces 25 at the right-hand portion of the die (Fig. 1) are in engagement with the guide. These gaging surfaces 24 and 25 thus can be used in facilitating the nesting of the cuts, as will be hereinafter described. The gaging surfaces 26 are adapted to engage a straight edge 27 to locate the die for the initial cut along an edge of the material.

The die is provided with two bosses 28, in which are positioned spring-pressed plungers 30 and 32, respectively. These plungers terminate in gage members 34 and 36, which are shaped to correspond to portions of the curvature of the blanks to be cut, and are utilized in locating the die in position for successive cuts. For example, as shown in Figs. 2 and 4, the die is moved between successive cuts in such a manner that the gage 34 is in contact with the wall of the material left by the preceding cut, thus making it possible to locate the die in predetermined position with its cutting edge closely adjacent to the previous cut, but at the same time sufficiently spaced therefrom that the next cut to be made will not overlap the previous one. After one row of cuts has been made across the material, the die is turned end-for-end, and the gage 36 is used to locate the die in successive positions in producing the next row of cuts, this being illustrated at the left-hand portion of Fig. 2, in which the gage 36 is shown in successive positions of contact with the corner portion of successive cuts comprising the first row of cuts. Each of the plungers 30 is forced downwardly by a spring 38, downward movement of the plungers being limited by collars 40 pinned thereto and arranged to engage extensions 42 on the abutments 24, such that the gages 34 and 36 can project somewhat below the cutting edge 20 of the die in order to engage the side wall of the material after a blank has been removed therefrom. Rotation of the plungers 30 is prevented by means of downwardly projecting pins 44, which extend through openings in the plates 24.

The guide 16 is in the form of an angle iron, which extends across the work support 12 and has the end portions of its vertical flange 46 cut away, so that the ends of the horizontal flange 47 can project beneath arched brackets 48 secured to the work support 12 by bolts 49. The guide 16 can be located in either of two positions along the work support 12 in engagement with vertical walls of the brackets 48 and secured in position by set screws 50 and 52, which project through the bracket 48, and are rotatable to force the horizontal flange 47 of the guide down upon the work extending thereunder to clamp the same to the work support. The straight edge 27 is secured to the right-hand bracket 48 by screws, one of which is shown at 51.

The guide 16 carries a bracket 54 slidably mounted for movement along the guide 16 and arranged to be secured in its position by a hand nut 56, the construction being such as to permit adjustment of the bracket along the guide 16, or the removal of the bracket therefrom at such time as the bracket might interfere with operation of the die 14 on the material. The bracket has an elongated slot 58 near the free end thereof through which extends a spindle 60, which carries a gage 62. The gage 62 is normally forced downwardly by a spring 64 and can be adjusted along the slot 58 and locked in position by means of a washer 70 and nut 72.

In order to facilitate the handling of several layers of sheet material, it is desirable to clamp the same together by suitable means, such as C-clamps 74. A straight edge 76 is arranged to be engaged by side edges of the material to locate the same transversely of the work support 12.

In carrying out my method, several clamped layers of sheet material 10 from a roll (not shown) are brought forwardly over the work support 12 until the forward edge portions of the layers extend slightly beyond the gage 62, the guide 16 at this time being in its forward position, as shown in dotted lines in Fig. 2, and the guide is clamped down upon the material by screws 52. The die 14 is then placed upon the material with the gaging surfaces 24 in engagement with the vertical flange 46 of the guide 16, the die being located at the extreme right-hand portion of the material with a gaging surface 26 in contact with the straight edge 27. The die is then subjected to a pressure-applying operation, such as a blow of a hand mallet or a mechanically operated presser member, to force the die through the material. The die is then moved transversely with the gage members 24 again in contact with the guide 16, and the die is located relatively to the first cut by means of the gage member 34, which contacts with the side wall of that cut. This operation is repeated until a row of cuts is produced across the full width of the material. The screws 52 are then released, and the guide member 16 is moved rearwardly until its horizontal flange engages the bracket 48 and the screws 50 are then tightened to clamp the material down upon the work support. The die is then turned end-for-end and positioned with the gage members 25 in engagement with the guide 16 and with the gage 36 located in contact with the wall of the last cut made in the first row of cuts. The pressure is then applied to the die to produce the first cut of the second row of cuts, after which the die is successively moved into positions with the gage 36 in contact with successive cuts of the first row of cuts, and pressure-applying operations are made until a series of cuts are made which extend across the full width of the material to form the second row of cuts. This cycle of operations is repeated until a sufficient number of blanks is produced, or the entire length of the material is utilized, the material being pulled forwardly immediately prior to the formation of each odd row of cuts and the material being located in position lengthwise by engagement of the gage 62 with the edge of the material at the corner of a cut in the immediately preceding row.

Having described my invention, what I claim as new and desire to secure by Letters Patent of the United States is:

1. The method of cutting blanks from sheet material which consists in providing a straight edge and a die having gage members for engaging the straight edge and other gage members for engaging a cut portion of the work, positioning the straight edge upon sheet material located upon a work support, performing a series of cutting operations with the die successively spaced along the straight edge by a predetermined distance from a cut portion of the material formed by the preceding cut, shifting the straight edge through a predetermined distance laterally of the first row of cuts produced, and performing another series of cutting operations with the die successively located in nested position relatively to the cuts of the first row of cuts and spaced by predetermined distances along the straight edge.

2. The method of cutting blanks from sheet material which consists in providing a straight edge and a die having a plurality of gage members, placing the straight edge upon sheet material located upon a work support, performing a series of cutting operations with the die in engagement with the straight edge, shifting the die laterally after each cutting operation and locating it in position adjacent to the previous cut by contact of one of the gage members with the wall of the material formed by the previous cut, shifting the straight edge by a predetermined distance laterally of the row of cuts produced, performing a second series of cutting operations with the die in engagement with the straight edge, shifting the die laterally after each operation, and locating it in position adjacent to a previous cut in the second row of cuts and to cuts of the first row of cuts by engagement of another of the gage members with the edges of material formed by a previous cut, thus to produce a plurality of cuts in successive rows in closely nested relation.

3. For use in apparatus for cutting blanks from sheet material, a straight edge, and a freely movable cutting die having gage members for engaging the straight edge to locate the die along the material in one direction and having a gage adapted to engage a previously cut portion of the work for locating the die along the material in another direction.

4. For use in apparatus for cutting blanks from sheet material, the combination of a straight edge, and a die having a gage member for engaging the straight edge to position the die lengthwise of the material and having gage members adapted to engage previously cut portions of the material for locating the die in different positions widthwise of the material.

5. A die comprising a hollow base terminating in a cutting edge, abutments extending laterally from the die adapted to engage a straight edge for locating the die transversely of the sheet material to be operated upon, and a plurality of gage members carried by the die, each of which is adapted to engage a cut portion of the work formed by a previous cutting operation for spacing the die a predetermined distance from a preceding cut, the gage members being located relatively to the cutting edge of the die and to the abutments such that when the gage members are in engagement with a straight edge the die can be located by means of the abutments in nested relation to previously formed cuts.

ROY W. CUMMINGS.